No. 836,357. PATENTED NOV. 20, 1906.
W. ALETTER.
SELF ACTING COOKING APPARATUS.
APPLICATION FILED SEPT. 15, 1905.

UNITED STATES PATENT OFFICE.

WILHELM ALETTER, OF BERLIN, GERMANY.

SELF-ACTING COOKING APPARATUS.

No. 836,357.

Specification of Letters Patent.

Patented Nov. 20, 1906.

Application filed September 15, 1905. Serial No. 278,664.

*To all whom it may concern:*

Be it known that I, WILHELM ALETTER, a subject of the German Emperor, and a resident of Berlin, Germany, have invented certain new and useful Improvements in Self-Acting Cooking Apparatus, of which the following is a specification.

This invention relates to so-called "self-acting" cooking or boiling apparatus in which the vessel containing the previously-heated food is put into a chest or receptacle which is wholly surrounded by a bad conductor of heat.

It has for its object to enable such apparatus to be used also for baking or roasting purposes.

For this purpose the invention consists, essentially, in providing the said chest or receptacle with two stones which are heated when the apparatus is to be used and the vessel containing the food to be boiled and baked or roasted is put between them into the chest.

The apparatus which is the object of the present invention is represented in the accompanying drawings, in which—

Figure 1:
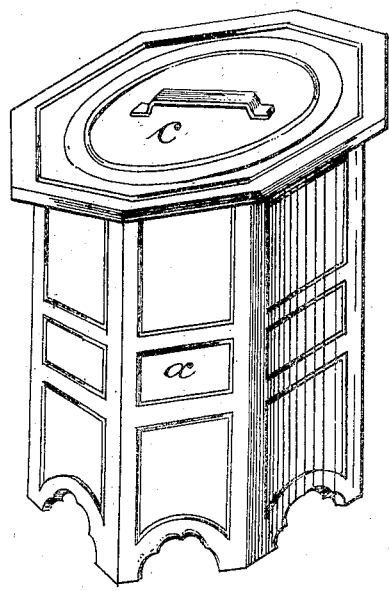
Figure 2:
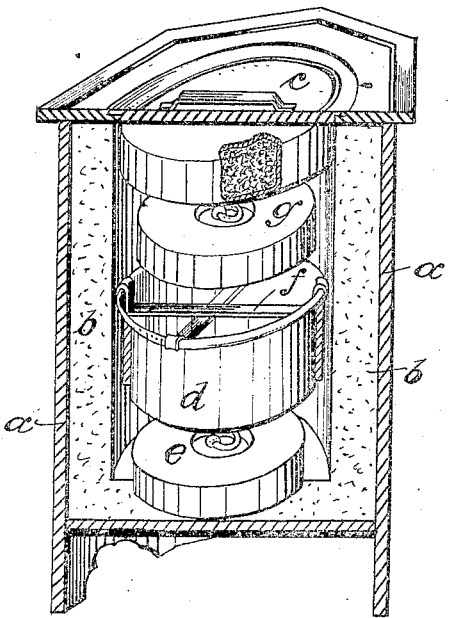

Figure 1 is a perspective external view; and Fig. 2 a vertical section, the inner parts being in perspective view and somewhat separated one from another.

The apparatus consists of the chest or receptacle the double walls of which are filled in the well-known manner with a bad conductor of heat $b$. The said chest can be closed by a cover $c$, having a hollow part entering into the hollow space of the chest and being also filled with a bad conductor of heat. In the chest $a$ is contained the vessel $d$, which contains the food to be roasted or baked, and said vessel rests on a removable plate or disk $e$, made of artificial or natural stone. On the top of the vessel $d$ iron bands or girders $f$ are hung, on which a second plate or disk $g$, of artificial or natural stone, is put.

If the apparatus is to be used, the cover $c$ is removed and the vessel $d$, together with the plates $e$ and $g$, are taken out of the chest $a$. The plates $e$ and $g$ are heated by means of an alcohol, gas, or other lamp or by any other source of heat. When the plates have become rather hot, the vessel containing the food to be roasted or baked (roast, joint, pie, or cake) is put for about ten minutes on one of them, while it continues to be heated. After sufficient heating first the plate $e$ is put on the inner bottom of the chest. Then the vessel $d$ is placed on it, and then the plate $g$ is put on the bands or girders $f$, which have been previously hung on the upper edges of said vessel. Then the chest is closed by the cover $c$ and left closed as long a time as is necessary for roasting or baking the food in an ordinary roaster or boiler. Then it may be opened and the food taken out directly or at any time afterward.

I do not claim in general self-acting cooking apparatus surrounded with a bad conductor of heat, nor do I claim in general the use of a heated plate with which the vessel is brought into contact within the chest, the main feature of my invention being the use of two plates or disks, which are made of stone and of which when heated the one is laid below and the other above the vessel containing the food to be boiled, roasted, or baked.

I claim—

1. An apparatus for automatically roasting or baking previously-heated food, consisting of a chest provided with a lining of a bad conductor of heat, a vessel $d$ into which the preheated food is placed, girders hung on the upper edge of said vessel, and two plates of stone which are to be heated before they are put into the chest and which are arranged one immediately below said vessel $d$ and the other supported upon the girders within said vessel.

2. An apparatus for automatically roasting or baking previously-heated food, consisting of a chest lined with a bad conductor of heat, a cover having a hollow part entering the hollow space of the chest, and also filled with a bad conductor of heat, a vessel $d$ into which the preheated food is placed, girders hung on the upper edge of said vessel, and two plates of stone which are to be heated before they are put into the chest, and are arranged one immediately below and to support said vessel and the other supported upon the girders within said vessel.

In testimony whereof I have signed my name to this specification in the presence of two subscribing witnesses.

WILHELM ALETTER.

Witnesses:
 HENRY HASPER,
 WOLDEMAR HAUPT.